United States Patent [19]
Davey

[11] Patent Number: 5,481,146
[45] Date of Patent: Jan. 2, 1996

[54] PASSIVE NULL FLUX COIL MAGNETIC BEARING SYSTEM FOR TRANSLATION OR ROTATION

[75] Inventor: Kent R. Davey, Lithonia, Ga.

[73] Assignee: Park Square, Inc., Marietta, Ga.

[21] Appl. No.: 120,003

[22] Filed: Sep. 10, 1993

[51] Int. Cl.⁶ ................................................. H02K 7/09
[52] U.S. Cl. ..................... 310/90.5; 310/156; 384/123
[58] Field of Search .................................. 310/90.5, 156, 310/52, 10, 90; 384/121, 123

[56] References Cited

U.S. PATENT DOCUMENTS

| | | | |
|---|---|---|---|
| 3,470,828 | 10/1969 | Powell et al. | 104/285 |
| 3,683,218 | 8/1972 | West | 310/80 |
| 3,814,550 | 6/1974 | Adams | 417/417 |
| 3,834,317 | 9/1974 | Miericke | 104/286 |
| 3,890,019 | 6/1975 | Boden et al. | 310/90.5 |
| 4,065,189 | 12/1977 | Sikorra | 310/90.5 |
| 4,080,012 | 3/1978 | Boden et al. | 310/90.5 |
| 4,088,379 | 5/1978 | Perper | 310/90.5 |
| 4,115,726 | 9/1978 | Patterson et al. | 318/722 |
| 4,316,394 | 2/1982 | Dohogne | 74/5.46 |
| 4,379,257 | 4/1983 | Hore | 318/695 |
| 4,444,444 | 4/1984 | Benedetti et al. | 310/90.5 |
| 4,574,211 | 3/1986 | Müller et al. | 310/68 R |
| 4,638,250 | 1/1987 | Shen-Orr et al. | 324/207.17 |
| 4,779,538 | 10/1988 | Fujiwara et al. | 104/282 |
| 4,849,666 | 7/1989 | Hoag | 310/90.5 |
| 4,913,059 | 4/1990 | Fujie et al. | 104/282 |
| 4,918,345 | 4/1990 | Vaillant de Guelis et al. | 310/90.5 |
| 4,959,568 | 9/1990 | Stokes | 310/51 |
| 4,979,445 | 12/1990 | Lanzara | 104/281 |
| 5,012,144 | 4/1991 | Huitema et al. | 310/14 |
| 5,036,236 | 7/1991 | Wilson | 310/90.5 |
| 5,036,256 | 7/1991 | Garrison et al. | 315/308 |
| 5,126,610 | 6/1992 | Fremerey | 310/90.5 |
| 5,137,286 | 8/1992 | Whitford | 277/80 |
| 5,302,874 | 4/1994 | Pinkerton | 310/90.5 |
| 5,315,197 | 5/1994 | Meeks et al. | 310/90.5 |
| 5,342,825 | 8/1994 | Iannello et al. | 505/166 |

OTHER PUBLICATIONS

Theory of a Synchronous Machine With a Self-Levitated Rotor, K. K. Kim and K. I. Kim, Electric Machines and Power Systems, 18:383–392, 1990, © 1990 by Hemisphere Publishing Co.

*Primary Examiner*—Steven L. Stephan
*Assistant Examiner*—D. R. Haszko
*Attorney, Agent, or Firm*—Peter K. Trzyna; Keck, Mahin & Cate

[57] ABSTRACT

An apparatus, and methods of making and using the apparatus, including at least a first path of magnetic flux perpendicular to and penetrating a first plane in space; preferably, a second path of magnetic flux perpendicular to the first plane and having a gradient such that no net flux passes the first plane; and a passive first null flux coil adjacent to the first plane; whereby when one of the first null flux coil and a combination of the paths is moving, the first null flux coil and the paths, combinatorily, are magnetically induced into alignment with respect to the first plane.

42 Claims, 9 Drawing Sheets

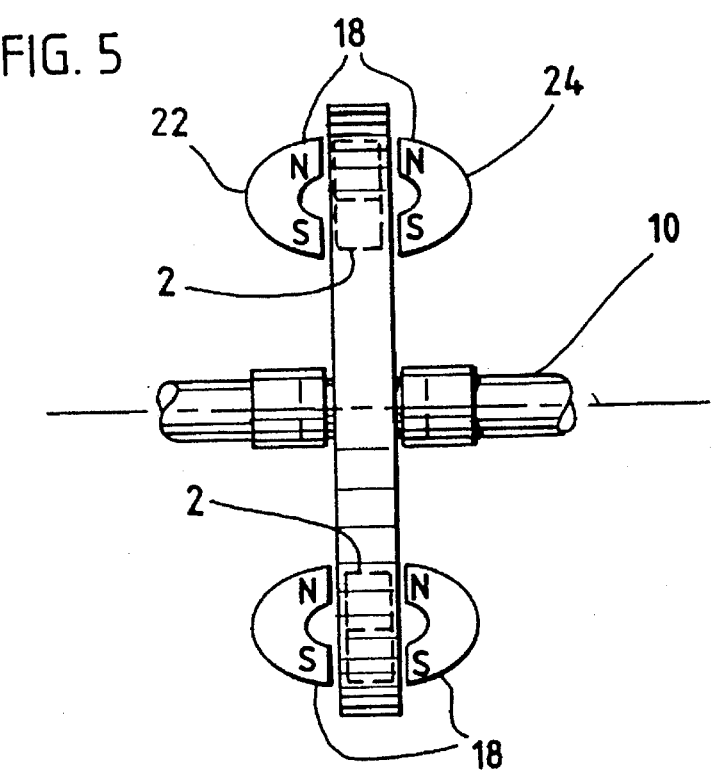
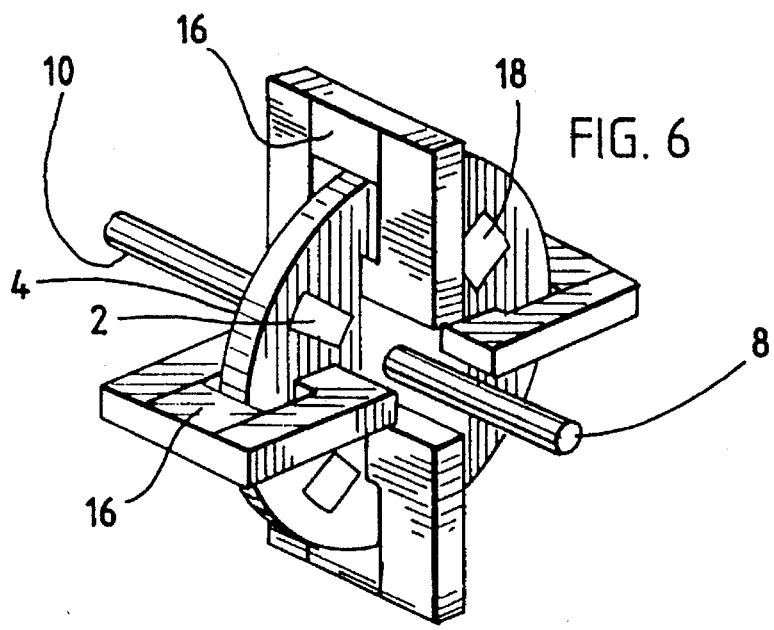

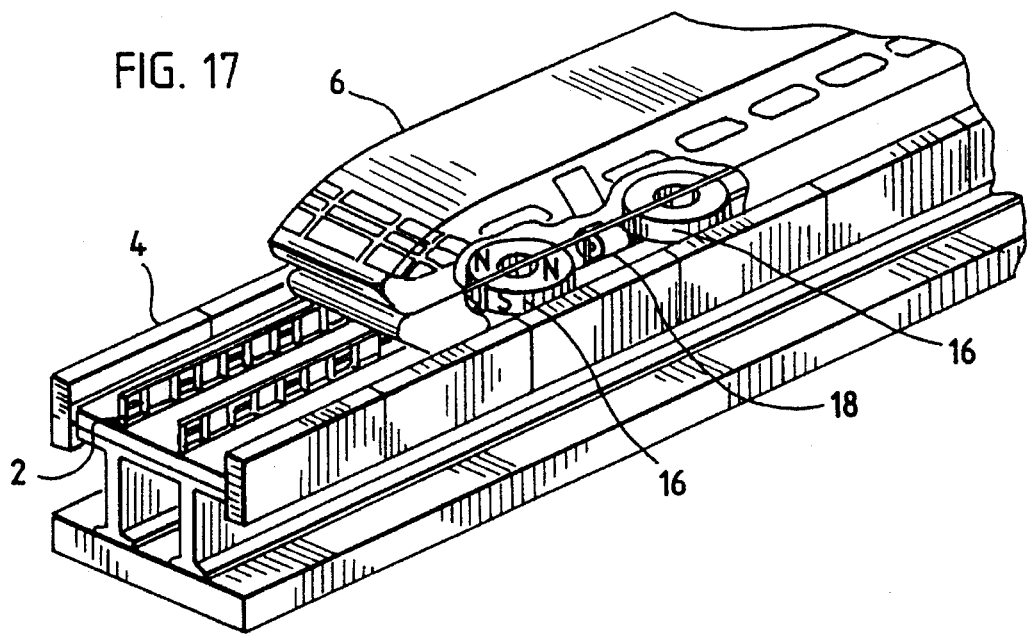
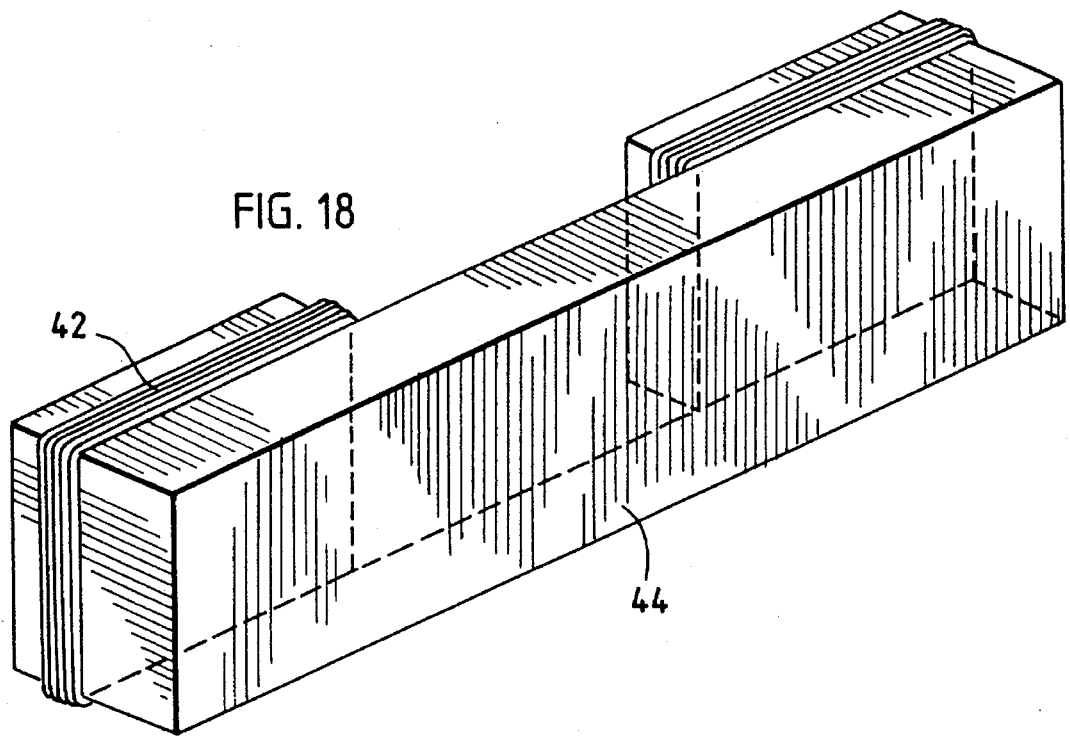

PASSIVE NULL FLUX COIL MAGNETIC BEARING SYSTEM FOR TRANSLATION OR ROTATION

FIELD OF THE INVENTION

The present invention pertains to an electrical generator or motor structure. More particularly, the present invention is directed to a magnetic bearing for rotary or translation applications.

BACKGROUND OF THE INVENTION

Generally, making very high rpm bearings has long posed technical challenges. Mechanical bearings have a high failure rate when operated at speeds over about 15,000 rpm. Improvements have generally included providing lubricants and smoother bearing races, and constructing the bearing from ever-stronger materials. Nonetheless, operating a mechanical bearing faster than about 70,000 rpm can be viewed as risky.

Accordingly, some have tried making magnetic bearings. One kind of magnetic bearing is an active system in which current from a power source is regulated to cause a stationary member to magnetically interact with one or more magnets on a moving member and thereby influence the position of the moving member. For example, in a rotary embodiment, a coil in a housing can be powered to magnetically pull a rotating rotor in closer. Two coils acting in tandem can sequentially pull such a rotor into a central position if the excitation frequency of the coils is sufficiently higher than the characteristic system inertial response time.

Another kind of magnetic bearing involves null flux coils. A "null flux coil" is a closed electric circuit, typically but not necessarily shaped like a FIG. "8, " wherein the sum of the fluxes produced by the circuit is zero. That is, no voltage is induced in the circuit when the flux is changing with time.

Certain uses of null flux coils have been proposed for some time. For example, U.S. Pat. No. 1,020,943 *Levitating Transmitting Apparatus* (Bachelet) issued Mar. 19, 1912, proposes using null flux coils in magnetic suspension systems for moving vehicles.

As to rotational applications in which current in a coil is increased or decreased actively to move a ferromagnetic disk closer or farther from a coil respectively, consider the following examples: U.S. Pat. No. 3,890,019 *Magnetic Bearings* (Boden), issued Jun. 17, 1975, and U.S. Pat. No. 4,065,189 *Magnetically Suspended Angular Momentum Wheel* (Sikorra), issued Dec. 27, 1977.

As to primarily translational applications, a null flux magnetic vehicle suspension system is mentioned in U.S. Pat. No. 3,470,828 *Electromagnetic Inductive Suspension and Stabilization System For A Ground Vehicle* (Powell), issued Oct. 7, 1969. Field sources comprised of two superconducting current loops are mounted on a vehicle. The two loops carry current in opposite directions, both directing flux at a central null flux coil. Track-based null flux coils made of electrically conductive, nonmagnetic material are positioned so that the superconducting current loops induce a current in null flux coils whenever the coils deviate from their equilibrium position.

U.S. Pat. No. 3,834,317 *Magnetic Moving Vehicle Suspension* (Miericke), issued Sep. 10, 1974, discusses a similar geometry using two sets of magnet coil loops, the loops having the same axis, and the loops each carrying current in opposite directions. Instead of using null flux coils, conducting laminated aluminum plates sandwiched between the loops, as well as at the center of the fringe region between the coil pairs, are used to produce stability and lift. The coils thus set up a central opposing field which acts to center a plate conductor. In this geometry a central fringe region field between one coil pair and another similar pair is used to produce lateral stability as well.

With the approaches of both Powell and Miericke, the magnetic field source loops carry current in opposite directions. These magnetic loops produce fields that are in repulsion, which creates a flux pattern having a gradient and no net flux passing through a plane located centrally between the loops. A combination of two such magnetic loops (energized coils), permanent magnets, electromagnets, and their equivalents will herein be referred to as repulsive magnetic field sources.

In contrast to the approach disclosed by Powell, U.S. Pat. No. 4,913,059 *Levitation-Propulsion Mechanism For Inductive Repulsion-Type Magnetically Levitated Railway* (Funji), issued Apr. 3, 1990, and U.S. Pat. No. 4,779,538 *Levitation, Propulsion and Guidance Mechanism For Inductive Repulsion-Type Magnetically Levitated Railway* (Fujiwara), issued Oct. 25, 1988, disclose magnet field loops excited to drive flux through the null flux coils. This creates a flux pattern passing in a direction, e.g., through a plane located centrally between the loops. This flux pattern can be produced with only one magnetic pole of a permanent magnet, magnetic loop (energized coil), electromagnet, or the like; though, two poles in field attraction are preferable. Such a source will herein be referred to as a transverse magnetic field source.

Restoring forces are generated because one of the two loops comprising the null flux coil links more flux if the loop is misaligned. Current induced commensurate with this additional linkage creates a restoring force to equalize the flux linkage of the two null flux coil loops. In the geometry of the Funji and the Fujiwara patents, the restoring force created by transverse magnetic field sources gives the vehicle lift. The teachings of these two patents are similar, as they involve a null flux loop on either side of the vehicle to produce lateral stabilization. Fujiwara also mentions connecting the two loops in series for more efficient lateral stabilization. In either case, though, the lateral stabilization is realized by the spatial decay of a $\vec{B}$ field away from primary superconducting magnet loops.

Drawbacks to the prior active bearing approaches tend to involve the need to detect how close the moving member is to the stationary member, and the use of circuitry responsive to the detection in order to regulate current to increase or decrease the pull on the magnet(s) on the moving member. It is difficult to detect and then regulate the current quick enough, for example, to keep a rotor stable at very high rpms, e,g., over 90,000 rpm.

Another drawback is that, if there is a power failure for an active system, the consequences can be catastrophic: control is lost for the bearing, which is spinning at a very high rpm, and from this, the support provided by the bearing for a component moving at the same speed in a machine is also lost. Unsupported components traveling at very high speeds portend catastrophe.

Other drawbacks of an active magnetic bearing system include the cost for such systems and the lack of design flexibility that result from the need to provide power control at a very high frequency.

Design flexibility is a particular concern for rotational applications. In the above-cited patents, those which involve passive null flux coil systems are for linear applications, and it is not apparent how any of these approaches might be used in a rotational geometry.

Efficiency is another concern in that they all use at least two null flux coils to realize the levitation and lift forces. Most of these systems use separate coils to realize each of these forces. Fujiwara is perhaps the most efficient in that it uses two null flux coils connected in series, but the cost for such an approach must be significant. So far as is known, no prior art system has been discovered in which a single passive null flux coil and two different types of magnetic field sources—transverse and repulsive—realize both levitation and lift forces.

SUMMARY OF THE INVENTION

Having utility in both translational and/or rotational applications such as those discussed above, and to address problems unresolved before, the present invention includes the following representative objects:

Unlike many of the above-described prior approaches, it is an object of the present invention to provide a passive system, i.e., a system that requires no direct input of current to the system.

Also in contrast to many of the approaches of the prior art, it is an additional object of the present invention to provide a system having both axial and transverse stabilization using a common null flux coil.

These and other objects are addressed by a passive magnetic system for centering a first member having a normal axis and moving with respect to a second member. The first member can be comprised of at least one passive null flux coil, but preferably there is a plurality of null flux coils. At least one magnetic pole (but preferably two magnetic poles aligned with unlike poles oriented parallel to the normal axis) is fixed in position with respect to the second member, to pass a flux through the null flux coil, yielding a uniform flux through the coil to induce centering of the null flux coil transverse to the normal axis of the null flux coil. In addition, there are two stabilization magnetic poles fixed in position with respect to the second member. Each of the stabilization magnetic poles is oriented in field opposition and disposed on each side of the first member, the poles both being oriented to direct their respective fluxes into the null flux coil so that no net flux crosses midplane of the poles, yielding a spacial magnetic flux gradient, inducing axial centering of the null flux coil.

The aforementioned device can be made and used such that one or more magnetic poles directed to the null flux coil provides transverse centering. That is, when the null flux coil is moved closer to a magnetic field source, the coil links more flux, which induces a voltage in the coil, and thus, a current to flow in the coil. The current creates a magnetic field which interacts with the magnetic poles to transversely center the coil.

The aforementioned repulsive magnetic poles—preferably are pairs of poles from "C"magnets being disposed with poles in opposition—provide axial centering of the same coil. The axial centering in a rotational geometry occurs according to the same principle: axial movement with respect to the repulsive magnetic poles induces a voltage in the coil, causing a current to flow in the coil, which creates a secondary magnetic field. This secondary magnetic field interacts with the repulsive magnetic poles to axially center the coil.

There are several embodiments of the present invention, including a rotational version and a primarily translational (linear) version, both of which are subsequently discussed.

A key advantage of the present invention is that it is a passive system that provides both axial and transverse stabilization with a common null flux coil. This permits self-regulation, which avoids all the complications and limitations of sensing and regulating in active systems of the prior art. Also, there can be no catastrophe from a power failure, as the system does not require any directly input power. (The only time that the system of the present invention would fail is if there is no movement or insufficient movement to induce restorative magnetic fields, and these conditions are comparatively much less dangerous than a failure at a very high speed.) Further, a passive system (which is devoid of a power supply, transducer, control circuitry, etc.) will inherently be less expensive than an active system. Accordingly, there are some very significant advantages over the known prior art.

BRIEF DESCRIPTION OF THE DRAWINGS

FIG. 5 shows a cutaway view B of FIG. 3 and repulsion magnetic field sources.

FIG. 6 is an oblique view of the rotational embodiment.

FIG. 17 illustrates a linear embodiment of the present invention and a cutaway view of a vehicle having both the transverse and repulsive magnetic field sources.

FIG. 18 illustrates an electromagnet having a bar wrapped with superconducting wire for the magnetic field sources.

DETAILED DESCRIPTION OF PREFERRED EMBODIMENTS

A primary feature of this invention is the use of two different types of flux pattern acting on a single null flux coil to produce all the degrees of constraint necessary for a passive rotary, or a passive linear, bearing. In the linear geometry, this approach makes for a more cost effective track because less conductive material need be placed in the track bed than a conventional system requiring a multiplicity of null flux coils. The present invention also lends itself to a rotary geometry because only one type of passive coil need be placed on a configured rotor. Another alternative is to locate one or more coils on one or both ends of an axle to yield transverse centering of the axle. Still another alternative is to place on the axle one or more coils, configured like "saddles," to induce axial centering. Additionally, such approaches can be used in combination. Still a third alternative is to separate the two type of field regions allowing differently oriented null flux coils to pass through each region.

Figure 1:
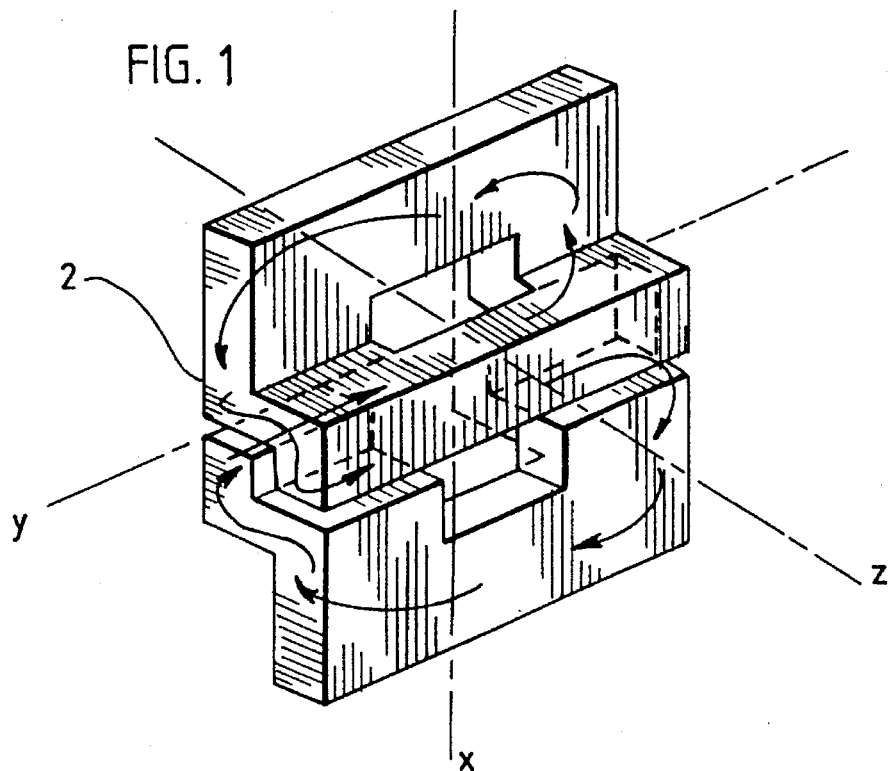
FIG. 1 illustrates a null flux coil embodiment in accordance with the present invention.

FIG. 1 illustrates a passive null flux coil 2 in accordance with the present invention. Null flux coil 2, can be comprised of a single loop of wire shaped in the form of a "figure 8" that is squared as illustrated in FIG. 1. Informing the "figure 8," there is electrical contact at one location (such as that on the right side of FIG. 1).

Consider that the null flux coil 2 is situated in space where there is a first (x) axis, a second (y) axis perpendicular to and intersecting the first (x) axis, and a third (z) axis perpendicular to both the first (x) axis and the second (y) axis; a first transverse magnetic flux path is located perpendicular to both the first (x) axis and the second (y) axis; a second repulsive flux path is also perpendicular to both the first (x) axis and the second (y) axis and has a gradient such that no net flux passes a plane defined by the first (x) axis and the second (y) axis.

When the null flux coil 2 is passed through the first and the second magnetic flux paths, no current is induced in the null flux coil 2 when the null flux coil 2 is centered, as in the plane containing the first (x) axis and the second (y) axis. But when the null flux coil 2 is displaced laterally (y direction) from the centered position, there is an increase in flux linkage for one-half of the null flux coil 2 and a decrease in flux linkage over the other half. Eddy currents are induced in the null flux coil 2, which magnetically interact with the magnetic flux. The interaction acts to magnetically center the null flux coil 2 laterally. If the null flux coil 2 is displaced axially (z direction), the flux linkage from the repulsive flux source links equal and opposite flux in the upper and lower portions of the null flux coil, resulting in an induced current which centers the coil axially.

A. Rotational Embodiments

Figure 2:
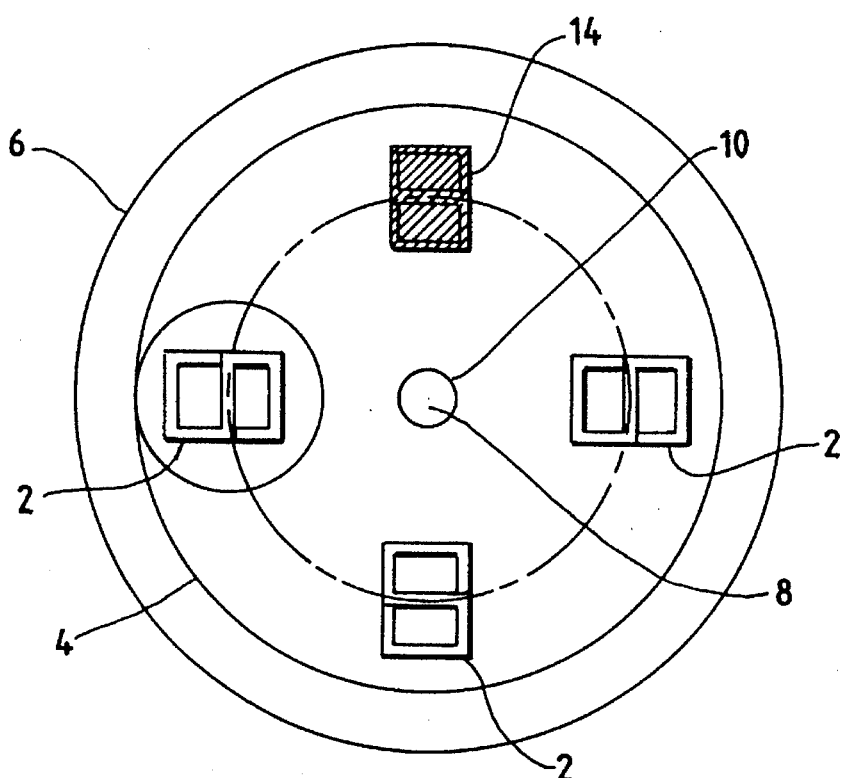
FIG. 2 illustrates a rotational embodiment having a rotor and four null flux coils.

A rotational embodiment of the present invention shown in FIG. 2 includes a first member 4 moving with respect to a second member 6, the first member 4 having a normal axis 8. The first member 4 is comprised of at least one null flux coil 2. In one embodiment, there is at least one, and preferably at least four of the null flux coils 2 disposed about the normal axis 8 and axle 10 every 90°.

In a rotating geometry, the first member 4 can usually, but not necessarily, be viewed as a rotor for revolving around an axle 10. And the second member 6 can comprise a rotor housing having more than one magnetic field source, each in position preferably fixed with respect to the second member 6. One of the magnetic field sources is a repulsive magnetic field source and another is a transverse magnetic field source, both producing the aforementioned respective flux paths and patterns.

The repulsive magnetic field source (e.g., two magnets in field opposition) can cover 100% of the area of the null flux coil 2, as depicted by the shaded area 14 of a null flux coil 2 in FIG. 2. However, the transverse magnetic field source (e.g., one magnet or two magnets in field attraction) should preferably be sized to cover a smaller area, for example, preferably between 80–90% of the area of a single null flux coil 2.

Figure 3:
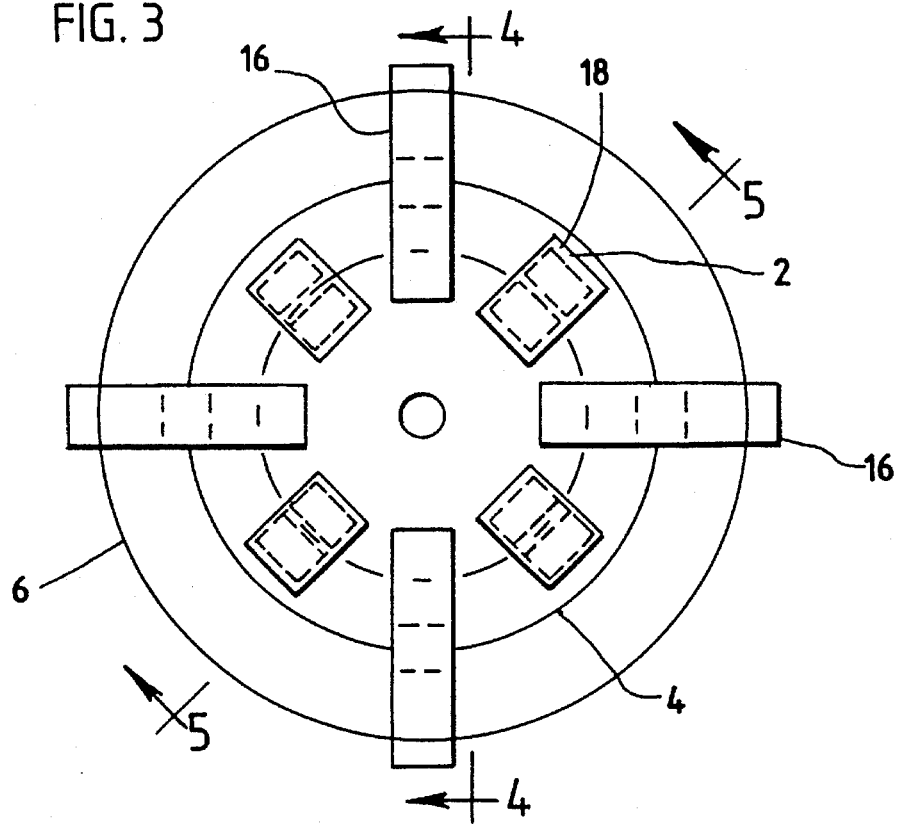
FIG. 3 portrays perspectives A and B cutaway through the rotor.

FIG. 3 illustrates the two above-mentioned magnetic field sources, each type producing a different flux pattern respectively for the aforementioned magnetic flux paths. The first pattern, produced by at least one and preferably two transverse magnetic field sources 16, drives flux through a plane visited by the null flux coil 2 (i.e., through a plane defined by the first (x) axis and the second (y) axis). The second pattern, produced by at least one repulsive magnetic field source 18, has a strong spatial gradient which drives no net flux through the same plane when the null flux coil 2 is centered with respect thereto. The two types of flux patterns generate restoring magnetic forces by induction to keep the null flux coil 2 centered between the magnetic field sources 16 and 18 as the null flux coil 2 is translated or rotated adjacent thereto. Because transverse and repulsive magnetic flux paths from sources 12 and 14 act on the same null flux coil 2, all necessary restoring forces are generated on the same null flux coil 2.

Figure 4:
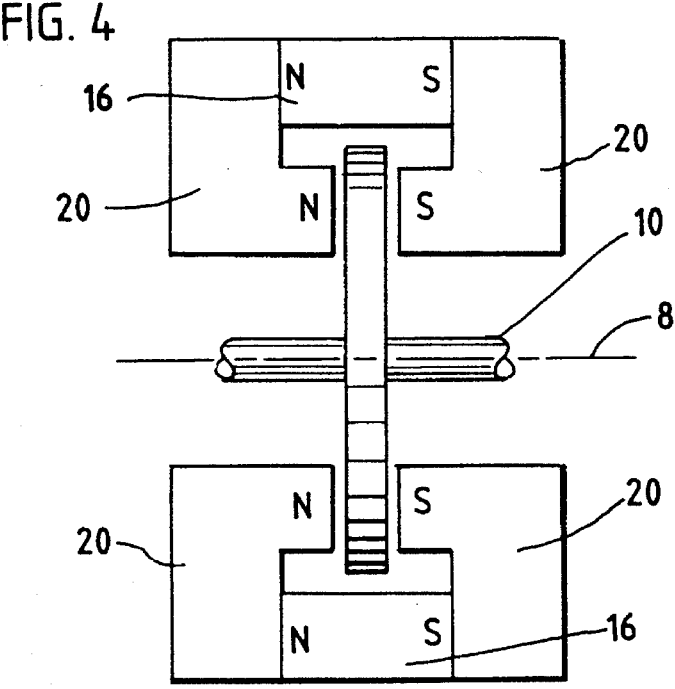
FIG. 4 shows a cutaway view A of FIG. 3 and transverse magnetic field sources.

FIG. 3 also portrays perspective views A and B, which are respectively shown in cutaway views of FIG. 4 and FIG. 5. Turning to FIG. 4, there is at least one transverse magnetic field source 16, which preferably is a static magnetic field source, such as a bar magnet. Flux from the magnetic field source 16 can be guided by ferromagnetic guides 20 to the null flux coil(s) 2. Of course, "C" magnets, current carrying coils, or other means for producing transverse magnetic flux would be acceptable. In FIG. 4, "N" and "S" respectively designate effective magnetic poles, which in this embodiment are induced in the ferromagnetic guides 20. The two magnetic poles are in respective positions, preferably fixed with respect to second member 6 (not shown in FIG. 4), with the magnetic poles oriented preferably parallel to the normal axis 8 such that a uniform flux is passed along the first flux path through the null flux coil 2. The uniform flux passed through the moving null flux coil 2 induces centering of the null flux coil 2 transverse to the normal axis 8.

FIG. 5 shows a cutaway view B of FIG. 3. There is at least one repulsive magnetic field source 18 preferably including two stabilization magnetic pole pairs 22 and 24. The repulsive magnetic field source 16 can be two magnets or poles, current carrying coils, or other means for generating repulsive magnetic flux, but preferably, repulsive magnetic field source 18 is comprised of two "C" magnets in field opposition.

Each repulsive magnetic field source 18 is in a respective position preferably fixed with respect to the second member 6 (not shown in FIG. 5). Each of the stabilization magnetic pole pairs 22 and 24, having magnetic poles "N" and "S", is oriented in field opposition along the aforementioned second flux path. That is, the pole pairs 22 and 24 are both oriented to direct their respective fluxes such that no net flux crosses midplane of the null flux coil 2 when it is centered with respect to the second flux path. This yields a spacial magnetic flux gradient, which acts to induce axial centering of the null flux coil 2.

The composition of the rotating first member 4 preferably should not be conductive or magnetizable, and must have the strength to withstand operational rpms. Also, the composition should have a low inductance (i.e., the L/R time constant should be small for high speed operation—the time constant should be less than 10% of the time that it takes for the flux source to sweep past the null flux coil). At high speed operation, a ceramic, for example, silicon nitrate or aluminum oxide, could be used.

FIG. 6 shows a perspective view of a rotational embodiment of the present invention. In such a sample rotational geometry, passive null flux coils 2 are used in conjunction with transverse and repulsive magnetic field sources 16 and 18 located around the first member 4 (e.q., the rotor).

Figure 7:
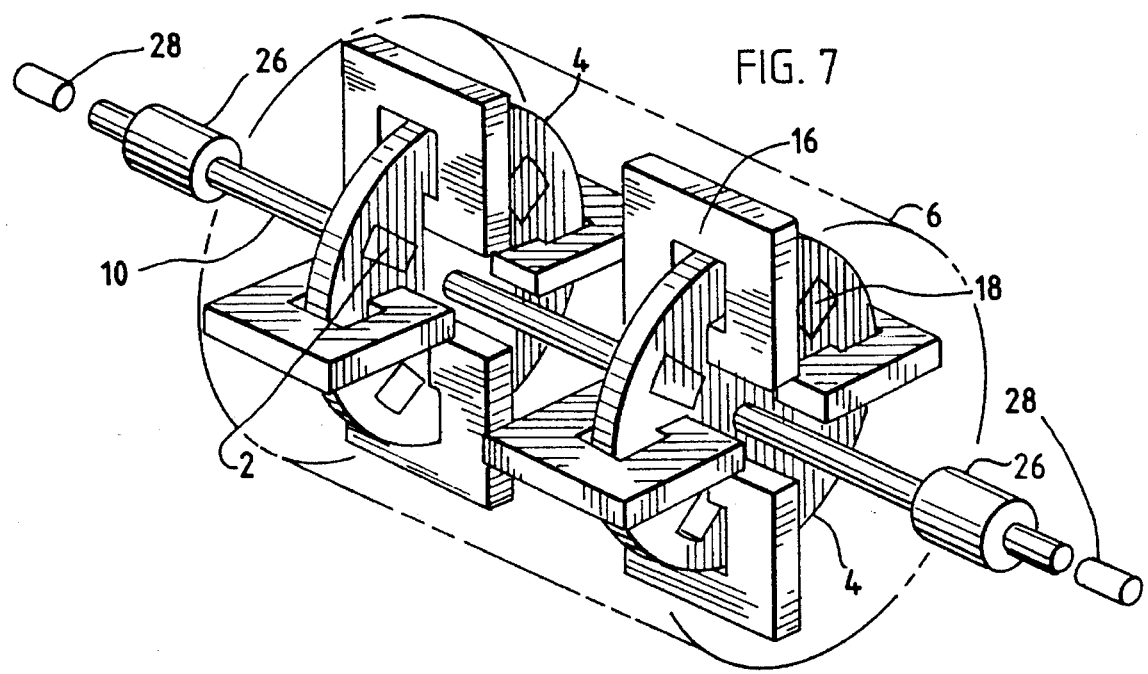
FIG. 7 is an oblique view for a rotational embodiment having two rotors on a common shaft.

FIG. 6 can be compared with another rotational embodiment illustrated in FIG. 7, a perspective view which showing a plurality of first members 4 linked together on axle 10, but spaced apart, to provide additional stability. A plurality of the null flux coils 2 are located on the first members 2 (e.g., the rotors). Slop bearings 26 are provided at either end of the axle 10 to catch the axle 10 at low speeds. The slop bearings 26 are conventional, loose fitting, mechanical bearings designed to have a large clearance so as not to interfere with the centering forces caused by the flux paths interacting with the null flux coils 2.

For rotational applications where there is a sizable axial thrust, the axial thrust can be further offset with another magnetic field source 28 magnetically pulling on either or both ends of a ferromagnetic axle 10.

Figure 8:
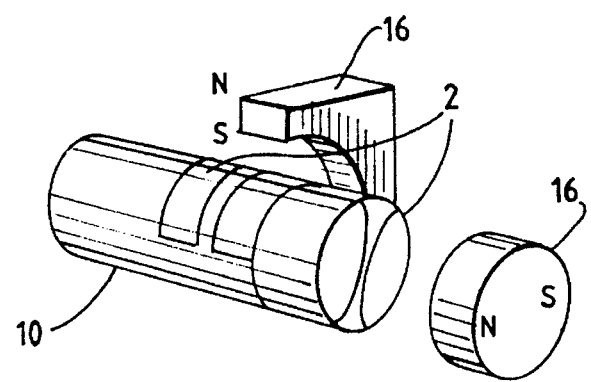
FIG. 8 illustrates alternate rotational embodiments, each of which can use only one transverse magnetic field source.

FIG. 8 illustrates additional configurations of the present invention, in which only one of the transverse magnetic field sources is used. In such a first configuration, null flux coil 2 is located in (or on) an end of the axle 10 (or alternatively, on a rotor). An axial transverse magnetic field source 16 is located adjacent to the end of axle 10 and is oriented to drive flux into the null flux coil 2 on the end of axle 10. That is, the flux pattern and the axis 8 pierce a common plane.

In another configuration, null flux coil 2 is curved (i.e., the second (y) axis is circular such that the "plane" defined by the first (x) axis and the second (y) axis is tubular or cylindrical) and located in (or on) axle 10. A transverse magnetic field source 16 is located adjacent that null flux coil 2. A combination of the first and second configurations produces the stabilizing force for orienting and centering axle 10.

Figure 9:
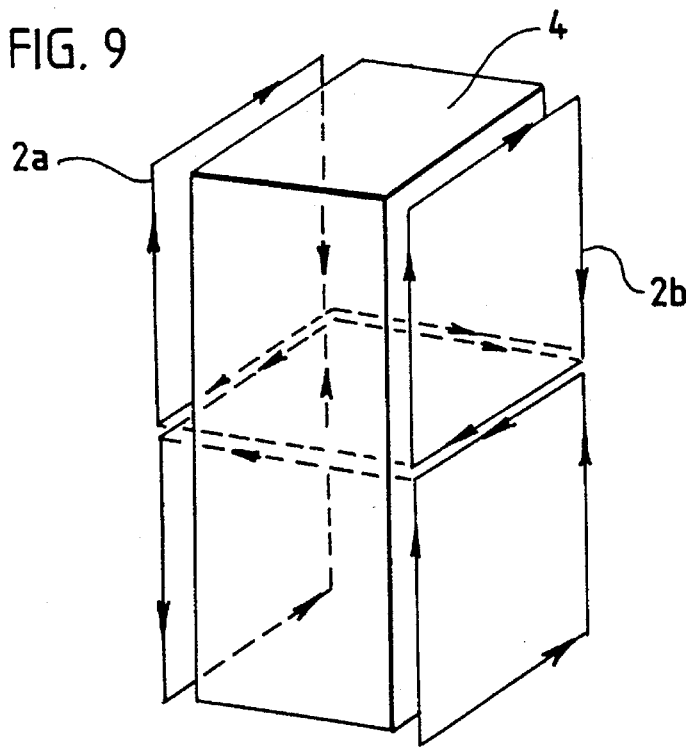
FIG. 9 illustrates an alternate embodiment for a null flux coil of the present invention wherein two coils are connected in series.

There may be some applications for the present invention in which it is preferable to use an alternative configuration of the null flux coil 2, such as that shown in FIG. 9. This configuration, the null flux coil 2 is comprised of two coils 2a and 2b connected in series. Such a configuration is useful in applications in which coils 2a and 2b are affixed respectively to both sides of the first member 4. The null flux coil 2 in this embodiment similarly has an apparent center located in a central plane between coils 2a and 2b, and would similarly be induced into central alignment by the flux in the aforementioned flux paths.

Figure 10:
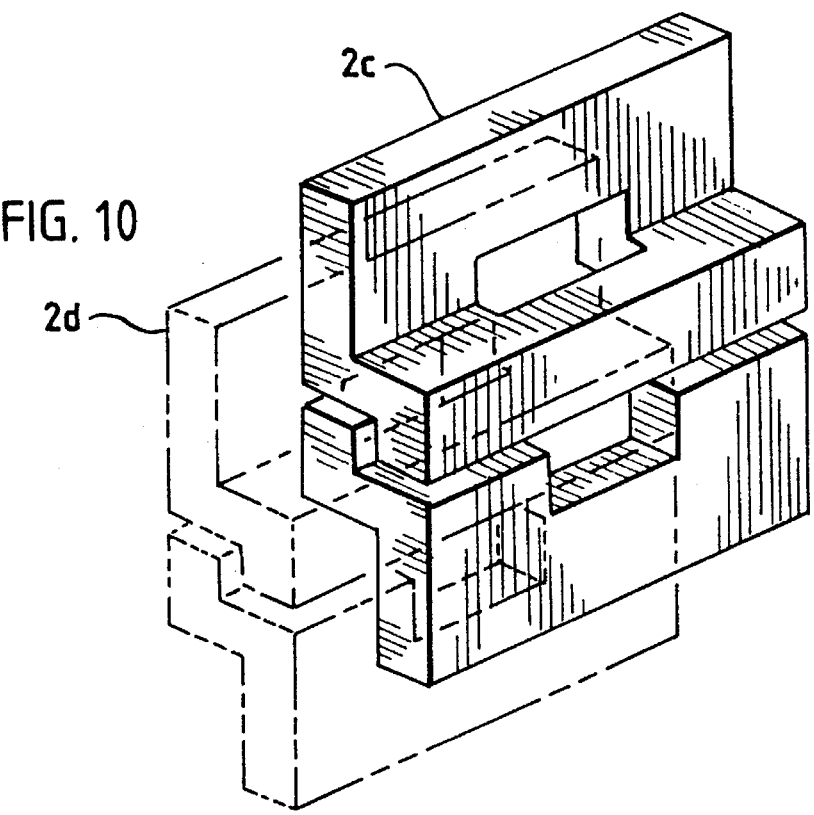
FIG. 10 illustrates overlapping null flux coils in accordance with the prior invention.

Still another embodiment is useful for smoothing out the centering forces that would otherwise be encountered impulsively, for example, at every 90° as suggested by null flux coil locations in FIG. 2. The null flux coils 2 can be configured to overlap, as illustrated in FIG. 10 (in linear or rotational embodiments). For rotational applications, each of the null flux coils 2 can be in an alignment rotated azimuthally with respect to its neighbor to more continuously induce centering of the first member 4.

The rotational embodiments of the present invention can be used in essentially any application in the prior art where rotational bearings have been used. However, the present invention is particularly suited to high speed rotational applications, for example, on an axle of an air cycle engine (e.g., as used in a jet heating/air conditioning system) or on an axle of an air compressor. Thus, the present invention is particularly preferable for devices with an operating speed of over 90,000 rpms.

Figure 11:
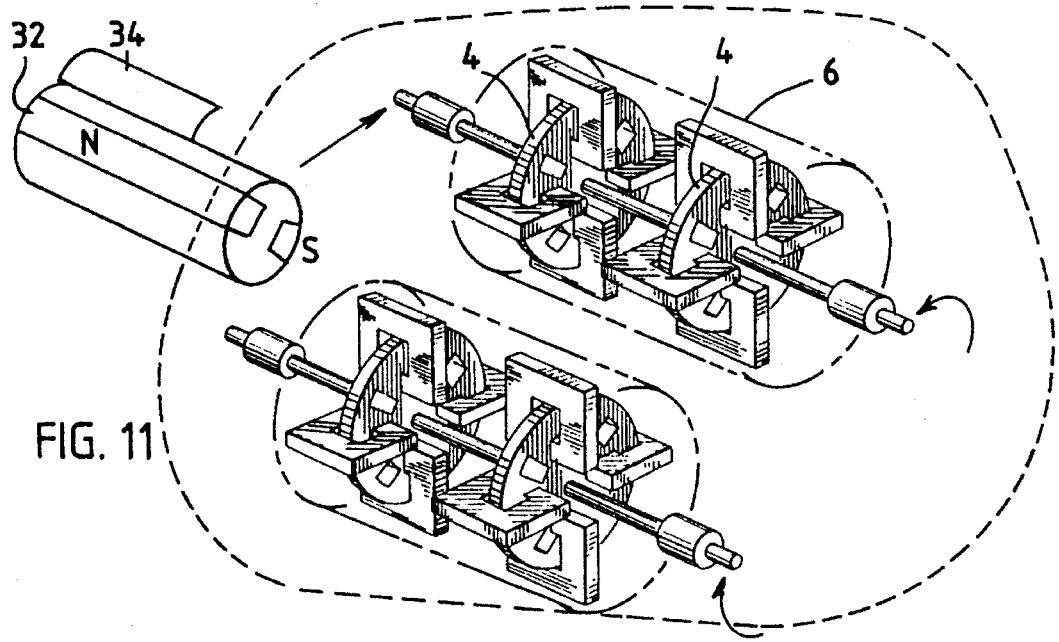
FIG. 11 illustrates another rotational embodiment of the present invention.
Figure 12:
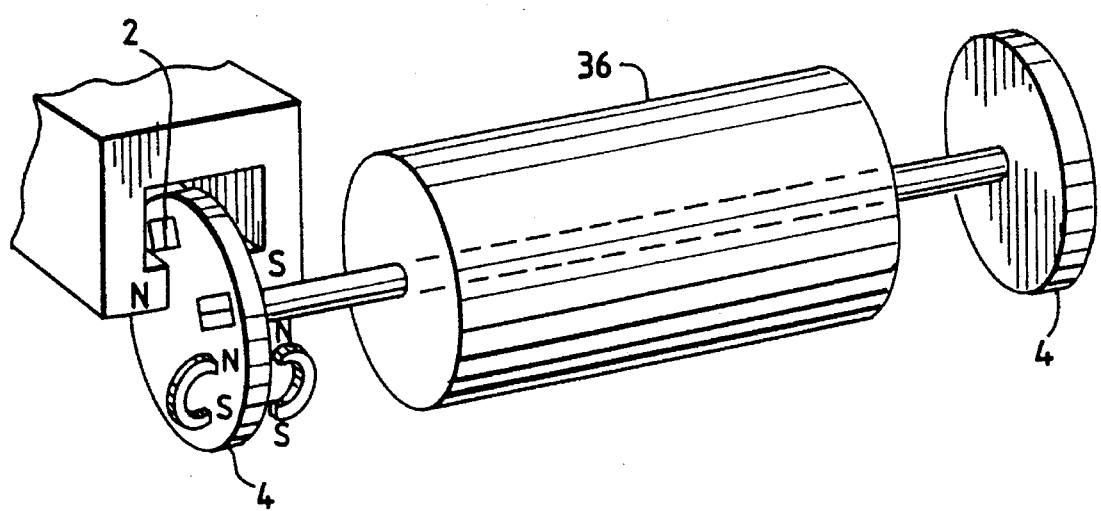
FIG. 12 illustrates another rotational embodiment of the present invention.

Another use of particular note is that of energy storage, which can be accomplished by having the first member (rotor) be a flywheel. Alternatively, as illustrated in FIG. 11, a plurality of first members 4 (e.q., rotors) can be located on a common axle 10 in stationary member 6. A plurality of the same are located in a common housing 30. It would be highly desirable to have an even number of stationary members 6, each with axles 10 rotating in opposite directions to cancel gyroscopic torques on the housing 30. Each axle 10 can have magnets 32 embedded in it to transfer energy to and from axle 10 by means of windings 34. Windings 34 can be excited to initiate a travelling magnetic field either leading or lagging the magnets 32 depending on whether energy is being added or taken out of axle 10. That is, windings and magnets together form a means for communicating energy into and out of the axle 10 (or rotor) with respect to a housing, i.e., by forming a motor and/or a generator, respectively.

A version of the energy storage use of the present invention uses a flywheel 36 for storing energy. The flywheel 36, which may be a cylinder, is attached to axle 10. First member 4 is attached to a proximate end of the axle 10 common to the flywheel 36. Axle 10 pierces flywheel 36, and another first member 4 is located on a distal end of axle 10. Flywheel 36 can have magnets 32 and windings 34, as in FIG. 11, to communicate energy into and out of the flywheel 36.

Figure 13:
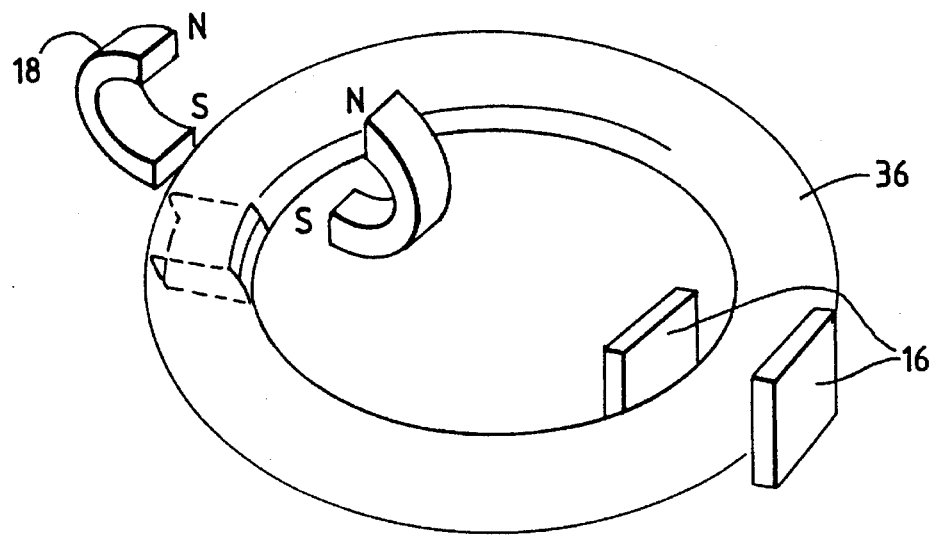
FIG. 13 illustrates another rotational embodiment of the present invention.

In energy storage applications, there is some advantage in using a ring or torroid shape for the flywheel 36 because inertia scales as the radius squared. A ring-shaped flywheel 36 can be constructed by winding high strength Kevlar rope, capable of withstanding large stresses, on a spool or mandrel, much like forming a ball of string. One such storage device is illustrated in FIG. 13. A "double-sided" null flux coil 2 discussed with respect to FIG. 9 spans both sides of the flywheel 36. For simplicity, only one pair of the transverse magnetic field sources 16 and two pole pairs of the repulsive magnetic field sources 18 are shown. In practice, preferably at least four of this combination of magnetic field sources 16 and 18 would be used.

The present invention also can be configured such that the magnets are affixed to the first member 4, and the null flux coil(s) 2 are affixed to the second member, i.e., the magnetic field sources 16 and 18 can be affixed to the flywheel 36, for example, to form a U-shaped channel on a radius of the toroid (first member) in which the null flux coils are located.

Figure 14:
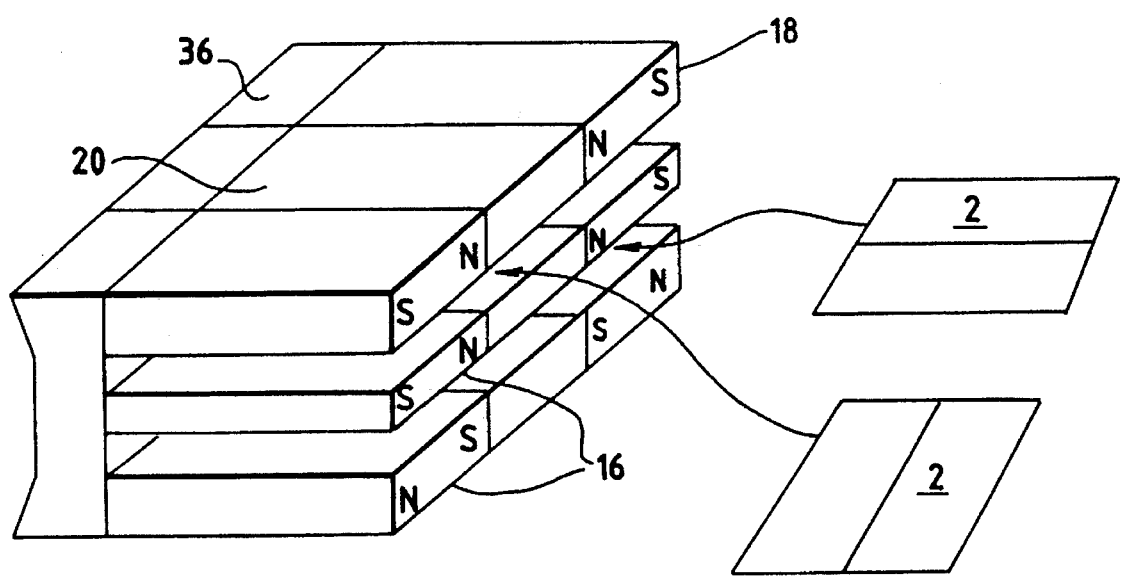
FIG. 14 is an illustration of the magnetic field sources in the rotational embodiment of the present invention shown in FIG. 13.
Figure 15:
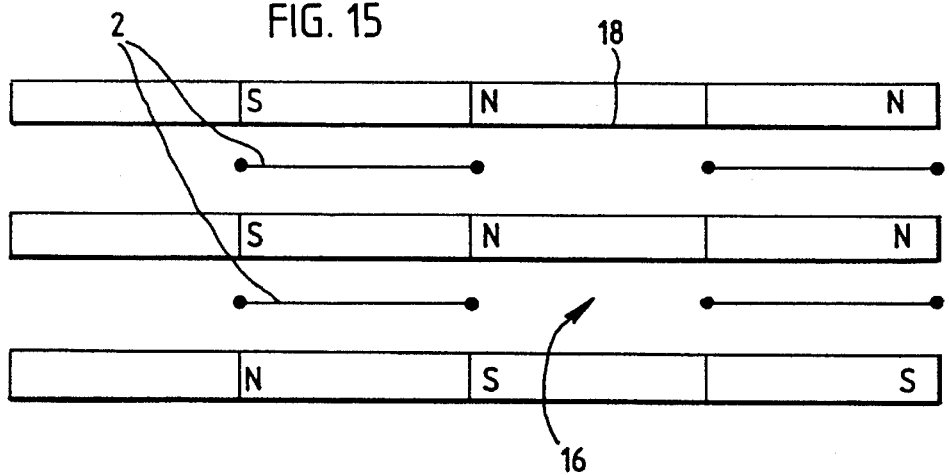
FIG. 15 is another illustration of magnetic field sources in accordance with the present invention.

Alternatively, as illustrated in FIG. 14, the magnetic field sources 16 and 18 can be positioned to form an E-shaped core attachment on the inner radius of the toroidal-shaped flywheel 36. One of the null flux coils 2 is inserted in an upper slot and another of the null flux coils 2 is inserted in a lower slot of the E-shaped core attachment. That is, the null flux coils 2 fit into channels of the E-shaped core attachment as illustrated in FIG. 15. As the flywheel 36 rotates, null flux coils 2 are in a fixed position with respect to flywheel 36 and would interact magnetically with the flux patterns to induce centering of the flywheel 36. In this particular embodiment, rather than exposing a null flux coil to the two kinds of flux patterns, two coils mounted on a common member can each be exposed to only one of the magnetic field sources 16 and 18. The null flux coils 2 being acted upon by the repulsive magnetic field source 18 would have currents induced to center the toroidal flywheel 36 axially, whereas the null flux coils 2 being acted upon by the transverse magnetic field source 16 would have currents induced to center the toroidal flywheel 36 radially. Note the center member of these two null flux coils 2 is different, the center leg of the coil in the repulsive region is radially oriented, while the transverse coil center portion is azimuthally oriented. Although the energy input and output to this embodiment can be accomplished via windings 34, as shown in FIG. 11, having the magnetic field sources on the rotating first member 4 can serve the dual purpose of providing the means for communicating energy into and out of the flywheel 36, i.e., by making further use of the magnetic field sources to form a motor and/or a generator, respectively.

A. Rotational Embodiments

Figure 16:
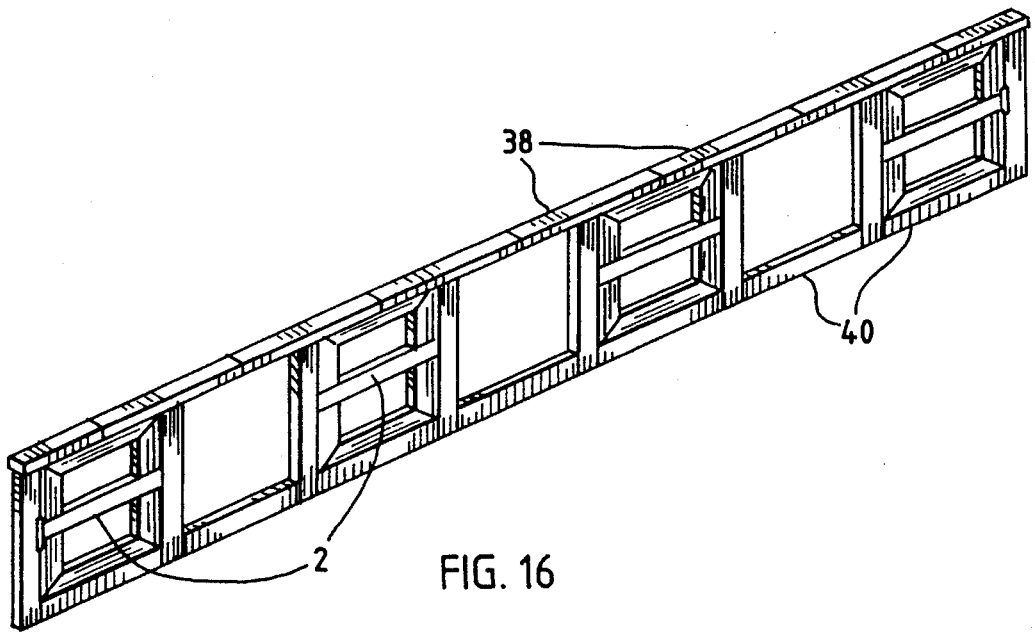
FIG. 16 illustrates null flux coils for a linear embodiment of the present invention.

The present invention can also be used in embodiments having a linear geometry. For example, the null flux coils 2 can be laid vertically along a track 40, as illustrated in FIG. 16 and FIG. 17. The passive null flux coils 2 can be located between current-carrying conductors, such as the T-shaped conductors shown in FIG. 16. The conductors create a linear force to propel a vehicle along the track 40, in a manner like that shown in corresponding U.S. patent application Ser. No. 07/835,186 titled "Propulsion System for a Magnetically Movable Vehicle," which is incorporated by reference herein In the configuration of the present invention shown in FIG. 17, first member 4 can be considered equivalent to a support structure on which track 40 is mounted, and second member 6 can be considered equivalent to a vehicle such as a maglev train.

In a preferred linear embodiment for a maglev train, three phase current travels in three lines along the support structure (first member 4), and preferably via brushes to the train (second member 6). After transforming and rectifying this current, a separate set of brushes is used to send current down one of the T-shaped conductors and back another electrically connected T-shaped conductor, etc. to power segments of the track 40.

The train (second member 6) is both levitated and stabilized laterally by the same passive null flux coils 2 and flux paths. Two parallel sections of the track 40 shown in FIG. 16 can be used to provide additional stability to the train. FIG. 17 shows the transverse magnetic source 16 and the repulsive magnetic source 18 in a horizontal configuration embedded within the train. The transverse magnetic sources 16 act to produce a lift and a propulsion field. The repulsion magnetic sources 18 act to stabilize the train laterally (from side to side).

A one or two rail system can be made with the rail(s) traversing a small, circular path, so that a vehicle traversing the path would function as a centrifuge. (Note that a plurality of such vehicles, joined about an axle, would form a rotor in a rotational embodiment of the present invention.)

3. Magnetic Field Sources

An alternative to using permanent magnets, energized coils, or the like, for either the transverse or the repulsive magnetic field sources 16 and 18 is shown in FIG. 18. It is an electromagnet 44, which can perform the same role as the transverse magnetic field source 16 or the repulsion magnetic field source 18 depending how its mate (if any) is oriented. The electromagnet 44 can be a channel electromagnet comprised of iron wrapped with a winding of superconducting wire 42.

In addition to a superconducting coil, superconducting magnets, such as a high temperature VIME (Very Incomplete Meisner Effect) magnet, provide another alternative for the magnetic field sources 16 and 18 of the present invention.

C. Summary

While this invention has been particularly shown and described with reference to preferred embodiments, it will be readily appreciated by those of ordinary skill in the art that various changes and modifications may be made without departing from the spirit and scope of the present invention. For example, and of particular note, the aforementioned embodiments can be modified to switch the sources of the flux with the null flux coil to achieve the equivalent result with only self-evident structural modification. So, for a more particular example, two spinning rotors with flux sources can point flux toward a circular path of stationary null flux coils. Similarly, in a linear embodiment, the null flux coils can be on the vehicle while the rail is comprised of flux sources. Though equivalent in principle, each may have its advantages and disadvantages for particular applications. The present invention, therefore, should not be viewed as being limited to the specific examples detailed in the forgoing. Instead, it is contemplated that the appended claims be interpreted as including the foregoing and other changes, modifications, and equivalents.

I claim:

1. An apparatus comprising:
   a first path of magnetic flux perpendicular to and penetrating a first plane in space;
   a second path of magnetic flux perpendicular to said first plane and having a gradient such that no net flux passes said first plane; and
   a passive first null flux coil adjacent to said first plane; whereby when one of said first null flux coil and a combination of said paths is moving, said first null flux coil and said paths, combinatorilly, are magnetically induced into alignment with respect to said first plane.

2. The apparatus of claim 1, wherein:
   said first flux path is produced by two magnetic poles in field attraction.

3. The apparatus of claim 1, further comprising a third path of magnetic flux perpendicular to said first plane and having a gradient such that no net flux passes said first plane; and wherein:
   said second flux path and said third flux path are produced by two C-magnets.

4. The apparatus of claim 1, wherein said first path of magnetic flux has a smaller area than said second path of magnetic flux.

5. The apparatus of claim 1, wherein at least one of said flux paths is produced by a superconducting coil.

6. The apparatus of claim 1, wherein at least one of said flux paths is produced by a Very Incomplete Meisner Effect magnet.

7. The apparatus of claim 1, wherein said first null flux coil is comprised of two coils connected in series.

8. The apparatus of claim 1, further comprising:
   a plurality of additional first magnetic flux paths penetrating and perpendicular to said first plane;
   a plurality of additional second magnetic flux paths perpendicular to said first plane and having a gradient such that no net flux passes said first plane;
   a plurality of null flux coils; whereby when said one is moved, sequentially alternating ones of said first magnetic flux paths and said second magnetic flux paths are encountered by said null flux coils, inducing alignment of said first member and said first plane.

9. The apparatus of claim 8, wherein said first null flux coil overlaps an other of said null flux coils.

10. The apparatus of any one of claims 1–9, wherein one of said null flux coil and a combination of said paths is in a position fixed with respect to a rotor, and said moving is rotational moving.

11. The apparatus of claim 10, wherein said first null flux coil is the one in a position fixed with respect to said rotor, and said flux paths are in respective positions fixed with respect to said housing.

12. The apparatus of any one of claims 1–9, wherein one of said first null flux coil and a combination of said paths is included in a rail, and is moving adjacent to said rail.

13. The apparatus of claim 12, wherein said first null flux coil is the one included in said rail, and said flux paths are in respective positions fixed with respect to a vehicle moving adjacent to said rail.

14. The apparatus of claim 1, further comprising:
  at least one additional first magnetic flux path penetrating and perpendicular to said first plane;
  at least one additional second magnetic flux path perpendicular to said first plane and having a gradient such that no net flux passes said first plane;
  at least one additional null flux coil attached to a first member having an axis; and wherein one of a combination of said null flux coils and a combination of said paths is located on said first member and positioned about said axis, such that rotation of said first member results in alternating ones of said first magnetic flux paths and said second magnetic flux paths being encountered by said null flux coils, inducing alignment of said first member and said first plane.

15. The apparatus of claim 14, wherein said first member is a first rotor and wherein said null flux coils are positioned about said axis.

16. The apparatus of claim 15, wherein said first member is a flywheel.

17. The apparatus of claim 16, wherein said null flux coils are each comprised of two coils connected in series.

18. The apparatus of claim 15, further comprising:
  a second plurality of first magnetic flux paths penetrating and perpendicular to a second plane;
  a second plurality of second magnetic flux paths perpendicular to said second plane and having a gradient such that no net flux passes said second plane;
  a second plurality of null flux coils attached to a second rotor, said rotors being connected by an axle; and wherein said second plurality of null flux coils is located on said second rotor and positioned about said axle, such that rotation of said second rotor results in alternating ones of said first magnetic flux paths and said second magnetic flux paths being encountered by said second plurality of null flux coils, inducing alignment of said second rotor and said second plane.

19. The apparatus of claim 18, further comprising:
  a flywheel attached to said axle between said first rotor and said second rotor.

20. The apparatus of claim 15, wherein said rotor has a torroid shape.

21. The apparatus of claim 14, wherein said combination of said paths is located on said first member and positioned about said axis.

22. The apparatus of claim 21, wherein said first member has a torroid shape with a channel spanned by said paths, said null flux coils in said channels.

23. The apparatus of any one of claims 14–22, further comprising:
  means for communicating energy between said first member and a housing.

24. The apparatus of claim 15, further comprising an additional bearing between said axle and said housing.

25. The apparatus of claim 1, further comprising:
  a plurality of additional first magnetic flux paths penetrating and perpendicular to said first plane;
  a plurality of additional second magnetic flux paths perpendicular to said first plane and having a gradient such that no net flux passes said first plane;
  a plurality of null flux coils; and wherein one of said plurality of null flux coils and said plurality of said paths is located along a line on said first member, and an other of said plurality of null flux coils and said plurality of said paths is located along a line on a second member, such that said moving results in alternating ones of said first magnetic flux paths and said second magnetic flux paths being encountered by said null flux coils, inducing alignment of said first member and said second member with respect to said first plane.

26. The apparatus of claim 25, wherein
  said null flux coils are on said first member, said first member being a rail, and said paths are in a position fixed with respect to a vehicle traveling along said rail.

27. The apparatus of claim 26, wherein
  said rail is comprised of T-shaped conductors located between said null flux coils and powered by a bus to communicate electricity to said vehicle.

28. The apparatus of claim 26, wherein
  said rail forms a circular path.

29. The apparatus of claim 26, further comprising:
  a second plurality of additional first magnetic flux paths penetrating and perpendicular to a second plane;
  a second plurality of additional second magnetic flux paths perpendicular to said second plane and having a gradient such that no net flux passes said second plane;
  a plurality of null flux coils along a second line of a second rail, inducing alignment of said vehicle with respect to said rails.

30. An apparatus comprising:
  a first member rotating periodically around an axis;
  a first magnetic source producing a flux path; and
  a first passive null flux coil; wherein
  one of said magnetic source and said null flux coil is mounted on said first member to move with respect to an other of said magnetic source and said null flux coil, to produce a respective periodically repeating flux pattern; whereby
  said flux pattern induces said null flux coil into alignment perpendicular to said path.

31. The apparatus of claim 30, wherein said flux pattern and said axis pierce a common plane.

32. The apparatus of claim 31, wherein said null flux coil is the one mounted on said first member.

33. The apparatus of claim 28, wherein said magnetic source is the one mounted on said first member.

34. The apparatus of claim 33, wherein said magnetic source is the one mounted on said first member.

35. The apparatus of claim 34, wherein said first member has a torroid shape with a channel spanned by said path, said null flux coil in said channel.

36. The apparatus of claim 35, further comprising:
  means for communicating energy between said first member and a housing.

37. The apparatus of claim 35, wherein
  said first flux pattern is a transverse flux pattern; and further comprising:

a second magnetic source producing a repulsive flux pattern; and a second passive null flux coil; wherein said first null flux coil is in a position fixed with respect to said second null flux coil.

38. The apparatus of claim 37, wherein said null flux coils are moved respectively through said flux patterns.

39. The apparatus of claim 37, wherein both said null flux coils are moved through both said flux patterns.

40. The apparatus of claim 31, wherein said flux pattern induces said axis into alignment perpendicular to said flux path.

41. The apparatus of claim 40, wherein said null flux coil is the one mounted on said first member.

42. The apparatus of claim 40, wherein said magnetic source is the one mounted on said first member.

* * * * *